(12) United States Patent
Li

(10) Patent No.: US 9,632,238 B2
(45) Date of Patent: Apr. 25, 2017

(54) BACKLIGHT MODULE AND LIQUID CRYSTAL DISPLAY

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 15/049,068

(22) Filed: Feb. 20, 2016

(65) Prior Publication Data

US 2016/0170134 A1   Jun. 16, 2016

Related U.S. Application Data

(62) Division of application No. 13/980,044, filed on Jul. 16, 2013, now Pat. No. 9,297,949.

(51) Int. Cl.
*G02F 1/1333* (2006.01)
*F21V 8/00* (2006.01)

(52) U.S. Cl.
CPC .......... *G02B 6/0091* (2013.01); *G02B 6/0068* (2013.01); *G02B 6/0085* (2013.01)

(58) Field of Classification Search
CPC ... G02F 2001/133314; G02F 1/133308; G02F 2001/133317
See application file for complete search history.

(56) References Cited

U.S. PATENT DOCUMENTS

2008/0024694 A1* 1/2008 Kondo ................ G02B 6/0085
349/58

* cited by examiner

*Primary Examiner* — Phu Vu
(74) *Attorney, Agent, or Firm* — Andrew C. Cheng

(57) ABSTRACT

A liquid crystal display includes a backlight module that includes a waveguide, a backboard, and a light source. The waveguide is disposed onto the backboard. The light source is arranged adjacent to a light incident surface of the waveguide. The backlight module includes a limiter securely attached to the backboard and abuts the light source so as to ensure a preset distance between the light source and the incident surface of the waveguide. With the limiter of the backlight module arranged to abut the light source, the coupling distance between the light source and the incident surface of the waveguide can be effectively kept constant without being compromised to zero (0) as resulting from expansion under heat or moisture or the accuracy during installation.

7 Claims, 3 Drawing Sheets

BACKLIGHT MODULE AND LIQUID CRYSTAL DISPLAY

CROSS REFERENCE TO RELATED APPLICATIONS

This is a divisional application of co-pending U.S. patent application Ser. No. 13/980,044, filed on Jul. 16, 2013.

BACKGROUND OF THE INVENTION

1. Field of the Invention

The present invention relates to a technical field of the liquid crystal display, and more particularly, to a backlight module and the liquid crystal display incorporated with such a backlight module.

2. The Related Arts

A typical liquid crystal display generally includes a liquid crystal panel and a backlight module incorporated with the liquid crystal panel. The panel itself does not emit any light, and therefore, the light beam from backlight module is used to light up the liquid crystal panel so as to display the images and pattern on the liquid crystal panel. A light emitting diode (LED) is a typical light source for the backlight module. Generally, a plurality of LEDs are arranged into an array on a printed circuit board so as to create a light bar or light strip. The LED array is then lit up by the power supplied from the driving circuit, and emit an linear light beam and into a light guide plate or waveguide to change this linear light beam into a surface light to light up the panel.

There is a coupling distance between the light emitting surface of the LED and the waveguide, and the coupling distance is used to ensure the displaying quality of the liquid crystal display and the utilization rate of the light beam emitted from the LED. In the actual implementation, because the waveguide will expand under heat as well as humid environment when it absorbs moisture, as well as the installation accuracy, the coupling distance could be reduced to 0 (zero), i.e. the waveguide is in fact in contact with the LED. Once the waveguide is in contact with the LED, a leakage of light beam will incur.

SUMMARY OF THE INVENTION

In order to resolve the existing technical problem of prior art, the present invention provides a backlight module including a waveguide, a backboard, and a light source, wherein the waveguide is disposed onto the backboard, and the light source is arranged adjacent to a light incident surface of the waveguide, wherein the backlight module includes at least a limiter securely disposed onto the backboard and abuts against to the light source so as to ensure a preset distance between the light source and the incident surface of the waveguide.

In addition, the limiter includes a connector and a pusher disposed on the connector, and the connector is arranged between the waveguide and the backboard, wherein the connector is rooted onto the backboard so as to support the waveguide, and wherein the connector abuts against the light source such that the abutting portion is close to the light source.

In addition, the backlight module further includes a heatsink arranged between the connector and the backboard and the heatsink includes a recess, a platform and a side, wherein the connector includes a backbone, and a carrier extending from the backbone, and an inclined transition located between the backbone and the carrier, wherein the backbone is disposed within the recess, and a locking device passing through the backbone, the recess and the backboard to interlock the backbone, the recess and the backboard together, and wherein the carrier is disposed onto the platform so as to carrier the waveguide, and the carrier abutting against the light source and the inclined transition is disposed onto the side of the recess.

In addition, the locking device is a screw, and the through hole is a threaded hole.

In addition, the light source includes a plurality of spot light sources and a light circuit board interconnected to the spot light sources, wherein the pusher includes a bracket and at least a tab supported by the bracket, wherein the heatsink further includes a sidewall on which the light circuit board is installed thereon, wherein the bracket is disposed onto the carrier to limit a transversal movement of a reflector disposed between the waveguide and the carrier, wherein the tab is disposed between two adjacent spot light sources, and wherein the dimension of the tab is larger than the dimension of the spot light source in the direction of the coupling distance.

In addition, heat conductive paste or glue is applied between the circuit board of the light source and the sidewall.

In addition, the limiter is integrally formed.
In addition, the limiter is made of a metallic material.
In addition, the limiter is made of a plastic material.

It is a further objective of the present invention to provide a liquid crystal display, including a backlight module and a liquid crystal panel arranged with respect to the backlight module that provides light to the liquid crystal panel, wherein the backlight module is described above.

According to the backlight module and the liquid crystal display of the present invention, by providing the limiter of the backlight module to abut against the light source, the coupling distance between the light source and the incident surface of the waveguide can be effectively kept constant without being compromised to zero (0) as resulting from expansion under heat or moisture or the accuracy during installation. By this arrangement, the leakage of the backlight module can be readily prevented. In addition, in order to have the limiter readily made as well as reducing the cost, the limiter can be made as a standard part so as to be implemented on the liquid crystal displays with different dimensions.

DETAILED DESCRIPTION OF THE PREFERRED EMBODIMENTS

In the description given to the preferred embodiment in view of the accompanied drawings, like elements will be given with similar numeral references. Detailed description will be given to the embodiment in light of the accompanied drawings. In the description given below, in order to avoid any confusion resulting from unnecessary descriptions to any configurational structure or function of prior arts, those descriptions in view of the prior art configuration and function have been omitted.

Figure 1:
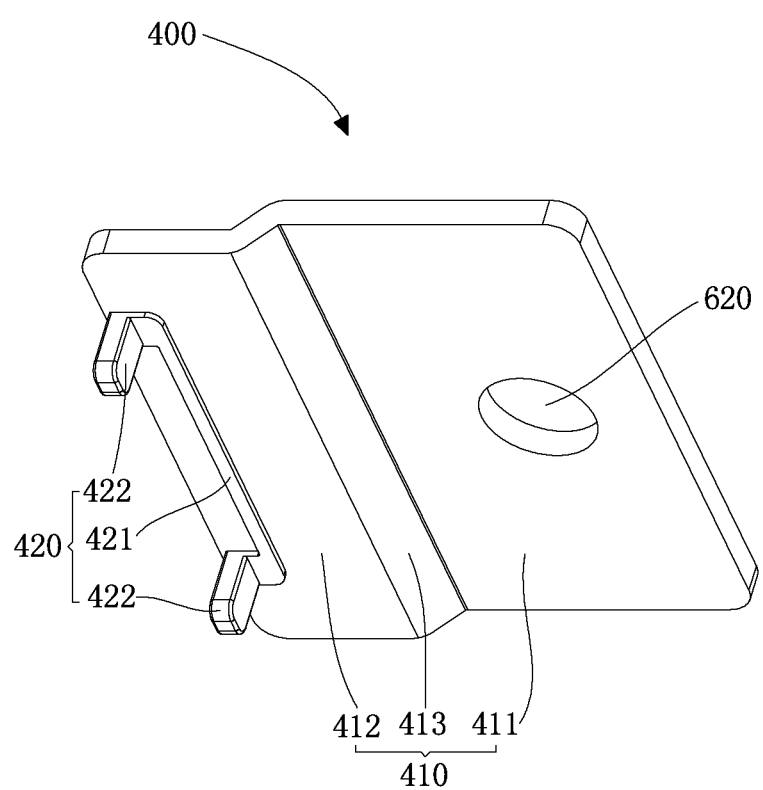
FIG. 1 is a configurational and perspective view of a limiter made in accordance with the present invention.
Figure 2:
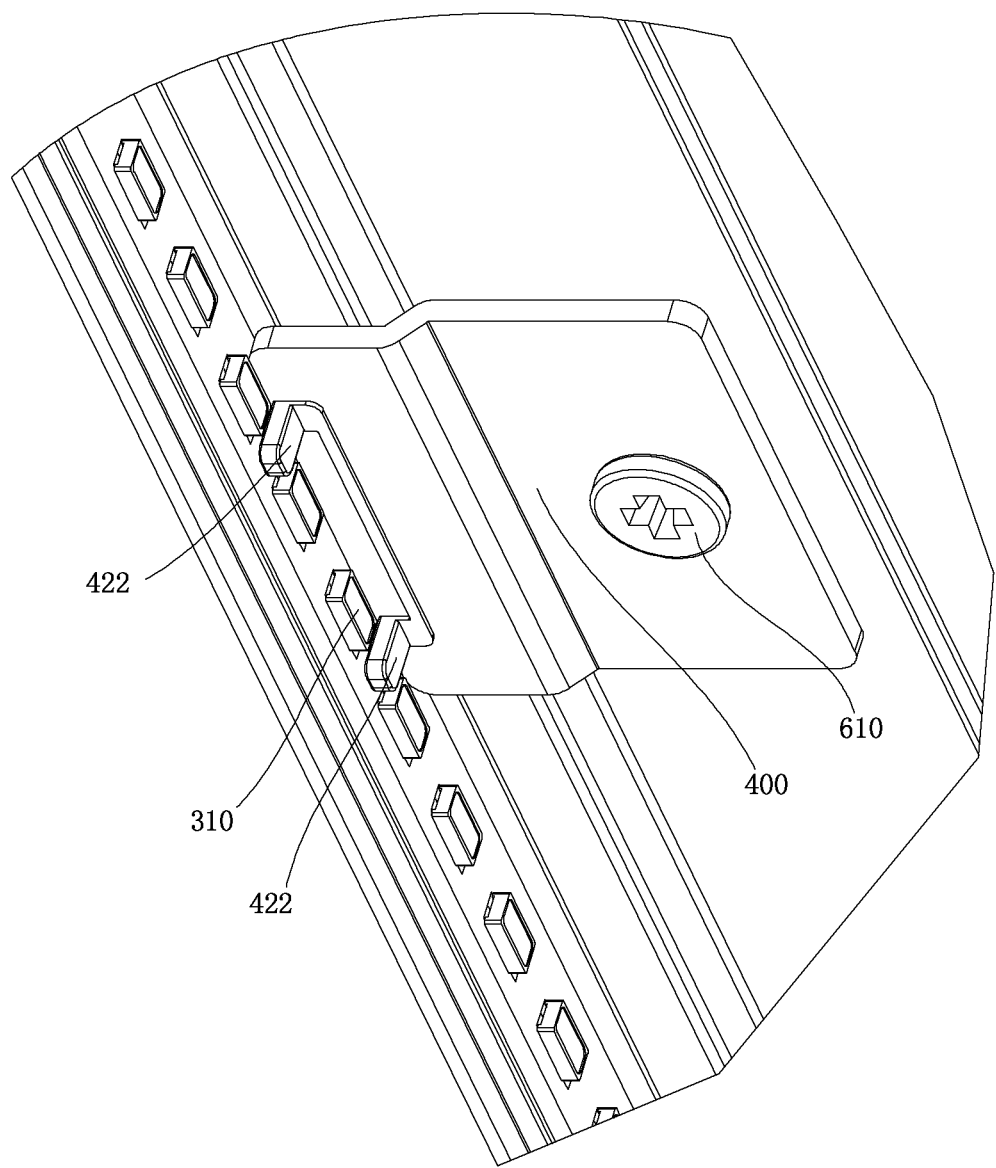
FIG. 2 is a partial and illustrational view showing the limiter made in accordance with the present invention is mounted onto a backlight module.

FIG. 1 is a configurational and perspective view of a limiter made in accordance with the present invention; FIG. 2 is a partial and illustrational view showing the limiter made in accordance with the present invention is mounted onto a backlight module; and FIG. 3 is a partial, cross-sectional view of the backlight module made in accordance with the present invention.

Figure 3:
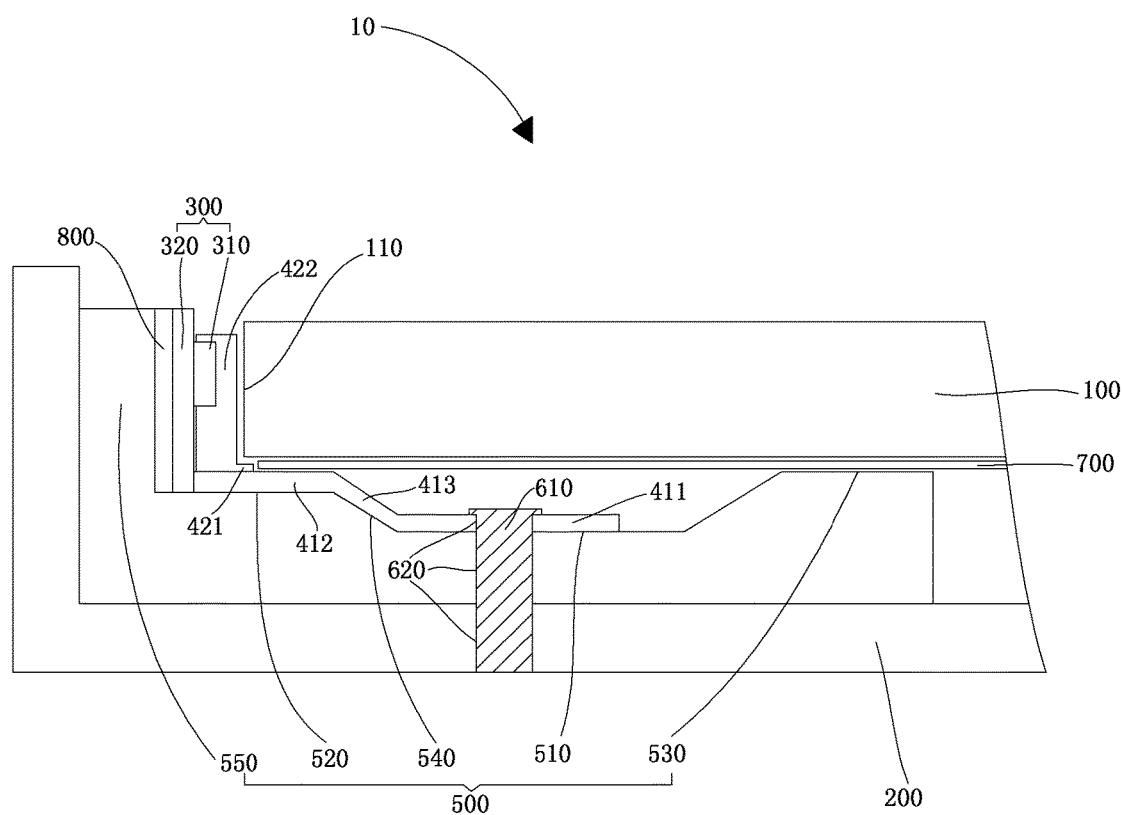
FIG. 3 is a partial, cross-sectional view of the backlight module made in accordance with the present invention.

Referring to FIGS. 1, 2, and 3, a backlight module made in accordance with the present invention includes a waveguide 100, a backboard 200, a light source 300, and a limiter 400.

The waveguide 100 is disposed onto the backboard 200, and the waveguide 100 includes an incident surface 110 and the light source 300 is disposed adjacent to the incident surface 110. The limiter 400 is mounted onto the backboard 200 and abuts against the light source 300 so as to keep a constant distance between the light source 300 and the incident surface 110. In the current invention, the number of the limiter 400 is not limited to what disclosed in FIG. 2. The actual quantity of the limiter 400 can be two or more than two in accordance with the actual requirements.

Substantially, the limiter 400 includes a connector 410 and a pusher 420 disposed onto the connector 410. The connector 410 is disposed between the waveguide 100 and the backboard 200. The connector 410 is mounted onto the backboard 200 and supports the waveguide 100. The connector 410 is mounted adjacent to the light source 300 so as to have the pusher 420 proximate to the light source 300.

The light source 300 includes a plurality of spot light source 310, such as light emitting diodes, and a light circuit board 320, such as a printed circuit board, interconnected to the spot light sources 310. The pusher 420 includes a bracket 421 and a pair of tabs 422, which are disposed adjacent to the plurality of spot light sources 310. Accordingly, when the waveguide 100 experiences an expansion under heat or absorption of moisture or an accuracy issue during the installation, the incident surface 110 of the waveguide 100 will then move closer to the light source 300 and the coupling distance is shortened. However, with the limiter 400 disposed between the light source 300 and the incident surface 110, the tabs 422 of the pusher 420 will prevent the incident surface 110 from moving toward light source 300. As a result, the coupling distance between the incident surface 110 and the light source 300 is kept constant. In order to keep the coupling distance between the plurality of spot light sources 310 and the incident surface 110 even further constant, preferably, the dimension of the tabs 422 is larger than the dimension of the spot light source 310 in the direction of the coupling distance. The function of the bracket 421 will be further described.

The connector 410 includes a backbone 411 and a carrier 412 extending from the backbone 411, and an inclined transition 413 arranged between the backbone 411 and the carrier 412. It is noted that the backbone 411 and the carrier 412 are located on different planes. The carrier 412 is used to support and carry the waveguide 100, and the backbone 411 is mounted onto the backboard 200. The interconnection between the backbone 411 and the backboard 200 and function of the inclined transition 413 will be described in more details hereinafter. The bracket 421 of the pusher 420 is mounted onto the carrier 412 so as to limit a reflector 700 from moving transversally, and the reflector 700 is arranged between the waveguide 100 and the carrier 412.

In the preferred embodiment of the present invention, in order to provide the backlight module 10 with a better heat dissipation performance, the backlight module 10 further includes a heatsink 500, which is mounted between the connector 410 and the backboard 200. The heatsink 500 includes a recess 510, a pair of platforms 520, 530, and an inclined side 540. The height of the platform 530 is higher than that of the platform 520. The function of the platforms 520, 530 will be described in more details hereinafter.

The connector 411 is disposed within the recess 510 and a screw 610 is used to interlock the backbone 411, the recess 510 and the backboard 200 in which a threaded hole 620 is defined. By this arrangement, the backbone 411, the recess 510, and the backboard 200 are securely interlocked together. The carrier 412 is mounted onto the platform 520 to carry the reflector 700 and the waveguide 100. The carrier 412 abuts directly the light circuit board 320 so as to have the tabs 422 disposed between every two adjacent spot light sources 310, respectively. The platform 530 directly supports the reflector 700 and the waveguide 100. The height of the platform 520 plus the thickness of the carrier 412 equals to the height of the platform 530. Accordingly, the reflector 700 and the waveguide 100 can be kept horizontally. The inclined transition 413 is disposed onto the inclined side 540.

It should be noted that the screw 610 can be replaced with other suitable devices, such as a rivet. The threaded hole 620 can be replaced by a through hole once a rivet is used. In addition, a bonding agent can be arranged between the backbone 411 and the recess 510, and between the recess 510 and the backboard 200. With the function of the bonding agent, the backbone 411, the recess 510 and the backboard 200 can be securely fixed together.

Furthermore, in the preferred embodiment of the present invention, the heatsink 500 further includes a sidewall 550. The light circuit board 320 can be attached to the sidewall 550, and the heat built up in the light circuit board 320 because of the energy powering the spot light source 310 can be readily dissipated to the backboard 200 through the heatsink 500, and the heat will be further dissipated to the ambient environment through the backboard 200. By this arrangement, the heat generated by both the spot light sources 310 and the light circuit board 320 can be effectively dissipated. Of course, the heatsink 500 can exclude the sidewall 550, while a supporting frame can be installed on the backboard 200 at a position corresponding to the light source 300. The supporting frame can be used to install the light source 300. The supporting frame can be readily attached to the backboard 200 with the existing technology generally available to the skill in the art. The present invention will not be limited thereto.

The light circuit board 320 and the sidewall 550 of the heatsink 500 can be deployed with heat conductive paste or glue 800 so as to securely attach the light circuit board 320 to the sidewall 50. In addition, the deployment of the heat conductive paste or glue can effectively dissipate the heat generated by the light circuit board 320. Of course, the light circuit board 320 can be attached to the sidewall 500 by ways of other mechanical measurements, such as screw or the like. The present invention is not limited thereto.

It should be noted that in the current embodiment, the limiter 400 can be integrally formed. Of course, the limiter 400 can be configured with different components interconnected together. The present invention should not be limited thereto.

In addition, according to the preferred embodiment of the present invention, in order to further dissipate the heat generated from the light circuit board 320 and the spot light sources 310 to the heatsink 500, the limiter 400 can be made from a metallic material, such as zinc-plated steel plate (SECC) or galvanized high carbon steel (SGCC) or aluminum alloy (AL5052). Of course, the present invention will not be limited thereto, as the limiter can be made from a plastic material, such as the white or transparent polycarbonate (PC) or polymethyl methacrylate (PMMA).

Figure 4:
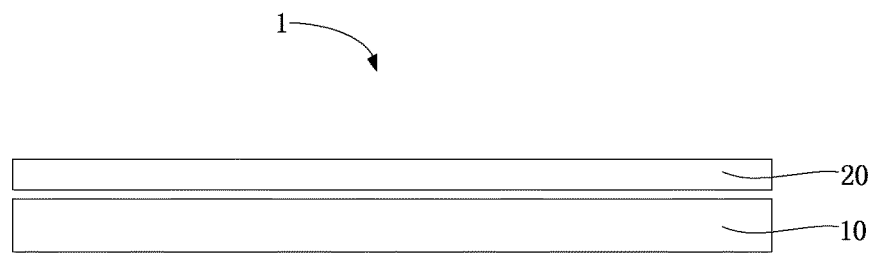
FIG. 4 is an illustrational view of a liquid crystal display made in accordance with the present invention.

FIG. 4 provides an illustrational view of a liquid crystal display made in accordance with the present invention.

As shown in FIG. 4, a liquid crystal display 1 made in accordance with the present invention includes a backlight module 10 and a liquid crystal panel 20 disposed opposite to the backlight module 10. The backlight module 10 provides light to the liquid crystal panel 20 such that images and pattern on the liquid crystal panel 20 can be shown.

In conclusion, by the limiter 400 of the backlight module 10 abutting the light source 300, the coupling distance between the light source 300 and the incident surface 110 of the waveguide 100 can be effectively kept constant without being compromised to zero (0) as resulting from expansion under heat or moisture or the accuracy during installation. By this arrangement, the leakage of the backlight module 10 can be readily prevented. In addition, in order to have the limiter 400 readily made as well as reducing cost, the limiter 400 can be made as a standard part so as to be implemented on the liquid crystal display with different dimension.

Even embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal display, comprising:
   a backlight module that supplies light; and
   a liquid crystal panel arranged opposite to the backlight module to receive the light supplied from the backlight module,
   wherein the backlight module comprises a waveguide, a backboard, and a light source that emits the light, the waveguide being disposed onto the backboard, the light source being arranged adjacent to a light incident surface of the waveguide to transmit the light to the light incident surface;
   wherein the backlight module comprises at least a limiter securely disposed onto the backboard and abutting the light source so as to ensure a preset distance between the light source and the incident surface of the waveguide;
   wherein the limiter comprises a connector and a pusher disposed on the connector, the connector being arranged between the waveguide and the backboard, the connector being rooted onto the backboard so as to support the waveguide, the connector abutting against the light source such that an abutting portion is close to the light source;
   wherein the backlight module further comprises a heatsink arranged between the connector and the backboard and including a recess, a platform, and a side, the connector including a backbone, and a carrier extending from the backbone, and an inclined transition located between the backbone and the carrier; and
   wherein the backbone is disposed within the recess, and a locking device passing through the backbone, the recess, and the backboard to interlock the backbone, the recess and the backboard together, wherein the carrier is disposed onto the platform so as to carry the waveguide, and the carrier abuts the light source and the inclined transition is disposed onto the side of the recess.

2. The liquid crystal display as recited in claim 1, wherein the locking device comprises a screw, and the through hole is a threaded hole.

3. The liquid crystal display as recited in claim 1, wherein the light source includes a plurality of spot light sources and a light circuit board to which the spot light sources are mounted, the pusher comprising a bracket and at least a tab supported by the bracket, the heatsink comprising a sidewall on which the light circuit board is attached, wherein the bracket is disposed onto the carrier to limit a transversal movement of a reflector disposed between the waveguide and the carrier, wherein the tab is disposed between two adjacent ones of the spot light sources, and wherein the dimension of the tab is larger than the dimension of the spot light source in the direction of the coupling distance.

4. The liquid crystal display as recited in claim 3, wherein heat conductive glue is applied between the circuit board of the light source and the sidewall.

5. The liquid crystal display as recited in claim 1, wherein the limiter is integrally formed.

6. The liquid crystal display as recited in claim 1, wherein the limiter is made of a metallic material.

7. The liquid crystal display as recited in claim 1, wherein the limiter is made of a plastic material.

* * * * *